US012780201B2

(12) United States Patent
Gelso et al.

(10) Patent No.: US 12,780,201 B2
(45) Date of Patent: Nov. 3, 2026

(54) METHOD AND SYSTEM FOR CONTROLLING A HEAVY COMMERCIAL VEHICLE IN UPHILL CONDITIONS

(71) Applicant: Volvo Truck Corporation, Gothenburg (SE)

(72) Inventors: Esteban Gelso, Västra Frölunda (SE); Leo Laine, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 68 days.

(21) Appl. No.: 19/100,709

(22) PCT Filed: Aug. 18, 2022

(86) PCT No.: PCT/EP2022/073067
§ 371 (c)(1),
(2) Date: Feb. 3, 2025

(87) PCT Pub. No.: WO2024/037721
PCT Pub. Date: Feb. 22, 2024

(65) Prior Publication Data
US 2026/0034988 A1 Feb. 5, 2026

(51) Int. Cl.
*B60W 30/18* (2012.01)
*B60W 10/08* (2006.01)
(Continued)

(52) U.S. Cl.
CPC ...... *B60W 30/18009* (2013.01); *B60W 10/08* (2013.01); *B60W 10/196* (2013.01);
(Continued)

(58) Field of Classification Search
CPC ............... B60W 40/076; B60W 40/11; B60W 2520/16; B60W 2552/15; G05D 1/0891
See application file for complete search history.

(56) References Cited

U.S. PATENT DOCUMENTS 6,571,768 B1 6/2003 Nishiyama
2018/0307236 A1* 10/2018 Reed ..................... B60W 10/18
(Continued)

FOREIGN PATENT DOCUMENTS

CN 111497860 A 8/2020
CN 114475562 A 5/2022
(Continued)

OTHER PUBLICATIONS

Real-time performance of control allocation for actuator coordination in heavy vehicles by Kristoffer Tagesson https://ieeexplore.ieee.org/document/5164359?source=IQplus (Year: 2009).*
(Continued)

*Primary Examiner* — Erin M Piateski
*Assistant Examiner* — John C Merino
(74) *Attorney, Agent, or Firm* — Withrow & Terranova, PLLC

(57) ABSTRACT

A method of controlling a vehicle with a plurality of motion actuators comprises: determining a longitudinal inclination and speed of the vehicle; selecting an uphill drive mode if the longitudinal inclination is greater than an inclination threshold and the absolute speed is less than a speed threshold, and otherwise selecting a regular drive mode; obtaining motion requests; in accordance with the selected drive mode, providing a solution to an optimization problem related to optimal control of the motion actuators in accordance with the obtained motion requests; and controlling the motion actuators in accordance with the solution to the optimization problem. The optimization problem is dependent on a control effectiveness matrix which is defined differently in the uphill drive mode and the regular drive mode.

12 Claims, 5 Drawing Sheets

(51) Int. Cl.

| | |
|---|---|
| ***B60W 10/196*** | (2012.01) |
| ***B60W 30/182*** | (2020.01) |
| ***B60W 50/00*** | (2006.01) |

(52) U.S. Cl.

CPC .......... *B60W 30/182* (2013.01); *B60W 50/00* (2013.01); *B60W 30/18136* (2013.01); *B60W 2050/0025* (2013.01); *B60W 2050/0039* (2013.01); *B60W 2510/18* (2013.01); *B60W 2520/10* (2013.01); *B60W 2540/10* (2013.01); *B60W 2540/12* (2013.01); *B60W 2552/15* (2020.02); *B60W 2710/08* (2013.01); *B60W 2710/18* (2013.01)

(56) References Cited

U.S. PATENT DOCUMENTS

| | | | | |
|---|---|---|---|---|
| 2019/0143812 | A1* | 5/2019 | Fuchs | A01C 15/003 701/50 |
| 2020/0231153 | A1 | 7/2020 | Yokota | |
| 2021/0155214 | A1 | 5/2021 | Quaiyum | |
| 2022/0080971 | A1* | 3/2022 | Bolger | B60W 30/182 |

FOREIGN PATENT DOCUMENTS

| | | | |
|---|---|---|---|
| DE | 102020122275 | A1 | 3/2022 |
| EP | 2892778 | B1 | 8/2017 |

OTHER PUBLICATIONS

Janardhanan, S. et al., "Concept design of electric cruise and startability axles for long haul heavy vehicles to maximise driving range," 2021 IEEE Vehicle Power and Propulsion Conference (VPPC), Oct. 21-28, 2021, Gijon, Spain, IEEE, 8 pages.

International Search Report and Written Opinion for International Patent Application No. PCT/EP2022/073067, mailed Mar. 15, 2023, 15 pages.

International Preliminary Report on Patentability for International Patent Application No. PCT/EP2022/073067, mailed Jan. 31, 2024, 13 pages.

* cited by examiner

METHOD AND SYSTEM FOR CONTROLLING A HEAVY COMMERCIAL VEHICLE IN UPHILL CONDITIONS

This application is a 35 USC 371 national phase filing of International Application No. PCT/EP2022/073067, filed Aug. 18, 2022, the disclosure of which is incorporated herein by reference in its entirety.

TECHNICAL FIELD

The present disclosure relates to the field of heavy commercial vehicles, notably such vehicles which are equipped with a motion support system that includes friction brakes and at least one electric propulsion actuator capable of electromagnetic (including regenerative) braking. The present disclosure proposes an optimization-based method of controlling the motion support system that is suitable for driving on an uphill road segment.

BACKGROUND

Many contemporary vehicles offer dedicated assistance to the driver in uphill conditions, that is, on a road segment with a significant positive grade. The driver assistance may in particular aim to prevent unwanted backward rolling of the vehicle when stopping on a hill. The occasions when the driver shifts their foot from the accelerator pedal to the brake pedal, or vice versa, have been identified as potentially hazardous, with a risk of sudden loss of control of the vehicle. In view of such scenarios, some driver assistance systems are configured to maintain the brake pressure for a preset period of time to allow the driver time to switch from the brake pedal to the accelerator pedal. Further, based on similar concerns, single-pedal driver interfaces have been proposed in the prior art, wherein the vehicle is configured to interpret a release of the single pedal as a braking request.

To mention one example, CN 114 475 562 discloses an uphill assist system for a vehicle, adapted for assisting a driver during stop and go of the vehicle in an uphill congested situation. When the accelerator pedal is released, the vehicle speed is reduced to a preset level, and the brakes are applied without the need to actuate the brake pedal. The applied brake force is dependent on the grade. When the driver wants to start driving the vehicle and actuates the accelerator pedal, real-time torque values are sent to a controller that reduces braking force/releases brake force when the torque value has reached a value sufficient to overcome gravity forces acting on the vehicle.

The present disclosure seeks to develop the available uphill assistance technology further, to enable new functionalities and to mitigate known shortcomings.

SUMMARY

One objective of the present disclosure is to make available a vehicle control method with an improved ability to assist the driver in uphill conditions. A further objective is to propose a vehicle control method that provides useful driver assistance over a wide range of vehicle speeds. A further objective is to implement such a vehicle control method in a framework of centralized vehicle motion management.

At least some of these objectives are achieved by the present invention as defined by the independent claims. The dependent claims relate to advantageous embodiments of the invention.

In a first aspect of the invention, there is provided a method of controlling a vehicle with a plurality of motion actuators. The method comprises: determining a longitudinal inclination $\alpha$ and speed $v_x$ of the vehicle; selecting an uphill drive mode if the longitudinal inclination is greater than an inclination threshold ($\alpha>\alpha_0$) and the absolute speed is less than a speed threshold ($|v_x|<v_{x0}$), and otherwise selecting a regular drive mode; obtaining motion requests; in accordance with the selected drive mode, providing a solution to an optimization problem related to optimal control of the motion actuators in accordance with the obtained motion requests; and controlling the motion actuators in accordance with the solution to the optimization problem. According to the first aspect of the invention, the optimization problem is dependent on a control effectiveness matrix which is defined differently in the uphill drive mode and the regular drive mode.

It is recalled that a control effectiveness matrix, denoted B, is a model of the global forces as a function of the actuator signals. It thereby provides an approximate mapping from actuator signals to actuator outputs. The control effectiveness matrix influences the total control effort of the vehicle's actuators and may thus be considered to be a generalized control gain. It is known from automatic control theory that, for a single technical system to be regulated by feedback control, the control gain can sometimes be set in several different ways depending on the desired dynamic behavior of the control loop. The inventors have realized that the use of two differently valued control effectiveness matrices, in the uphill drive mode and the regular drive mode, constitutes a powerful yet nondisruptive way of providing uphill driver assistance, which is easy to integrate in an existing vehicle motion management system.

In some embodiments, at least one element in the control effectiveness matrix has opposite signs in the uphill drive mode and the regular drive mode. This can be used to model the fact that the vehicle dynamics changes abruptly, as a result of inertial forces, when the longitudinal vehicle speed raises above a threshold. In particular, the sign-changing element in the control effectiveness matrix may represent a dependency between a longitudinal global force on the vehicle and the action of a frictional brake. In addition to the sign change, there may as well be a variation in the magnitude of the element in the control effectiveness matrix between the uphill drive mode and the regular drive mode.

In some embodiments, wherein the optimization problem is further dependent on a weighting matrix, the weighting matrix is defined differently in the uphill drive mode and the regular drive mode. Further, each of the weighting matrices involves a braking rule that specifies a preferred distribution of total requested brake force to the vehicle's motion actuators. Optionally, at least one of the braking rules defined by the weighting matrices is dependent on the vehicle's speed. The weighting matrix, denoted $W_u$, is applied to a difference of an actual and a desired actuator signal, $u-u_d$, in the optimization problem.

In some embodiments, where the motion requests are obtained from a single-pedal driver interface in the uphill drive mode, the optimization problem is further dependent on a weighting matrix which, in the uphill drive mode, is defined to specify a braking rule such that the preferred brake-force distribution varies with said single pedal's current depression. These embodiments can be said to capture an aspect of the driver's state of mind, knowing that a deeper pedal depression may be an intuitive reaction to an unexpected observation (e.g., oncoming traffic participant, newly discovered obstacle), and they provide an adequate response in terms of braking behavior. For example, the braking rule in the uphill drive mode could specify predominant use of the friction brakes when said single pedal is depressed less than a first depression threshold, and the braking rule could specify predominant use of electromagnetic braking (e.g., regenerative and/or dissipative braking) when said single pedal is depressed more than a second depression threshold. This enables an assistive and intuitive driver experience with good energy economy and a high degree of safety for other traffic participants. The term "pedal depression" covers also an acceleration-level signal from an autonomous driving system or the like.

In a second aspect of the invention, there is provided a controller configured for real-time control of motion actuators in a vehicle, such as a motion support system (MSS) in a heavy commercial vehicle. The controller may be suitable for deployment as a vehicle motion management (VMM) controller in the vehicle. It includes a motion-request interface for obtaining motion requests, and a control interface for feeding control signals to the motion actuators. The controller further includes processing circuitry configured to perform the method of the first aspect.

A controller with the technical features according to the second aspect of the invention generally shares the effects and advantages of the first aspect, and it can be embodied with a similar degree of technical variation.

The invention further relates to a computer program containing instructions for causing a computer, or the controller in particular, to carry out the above method of the first aspect. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Figure 1:
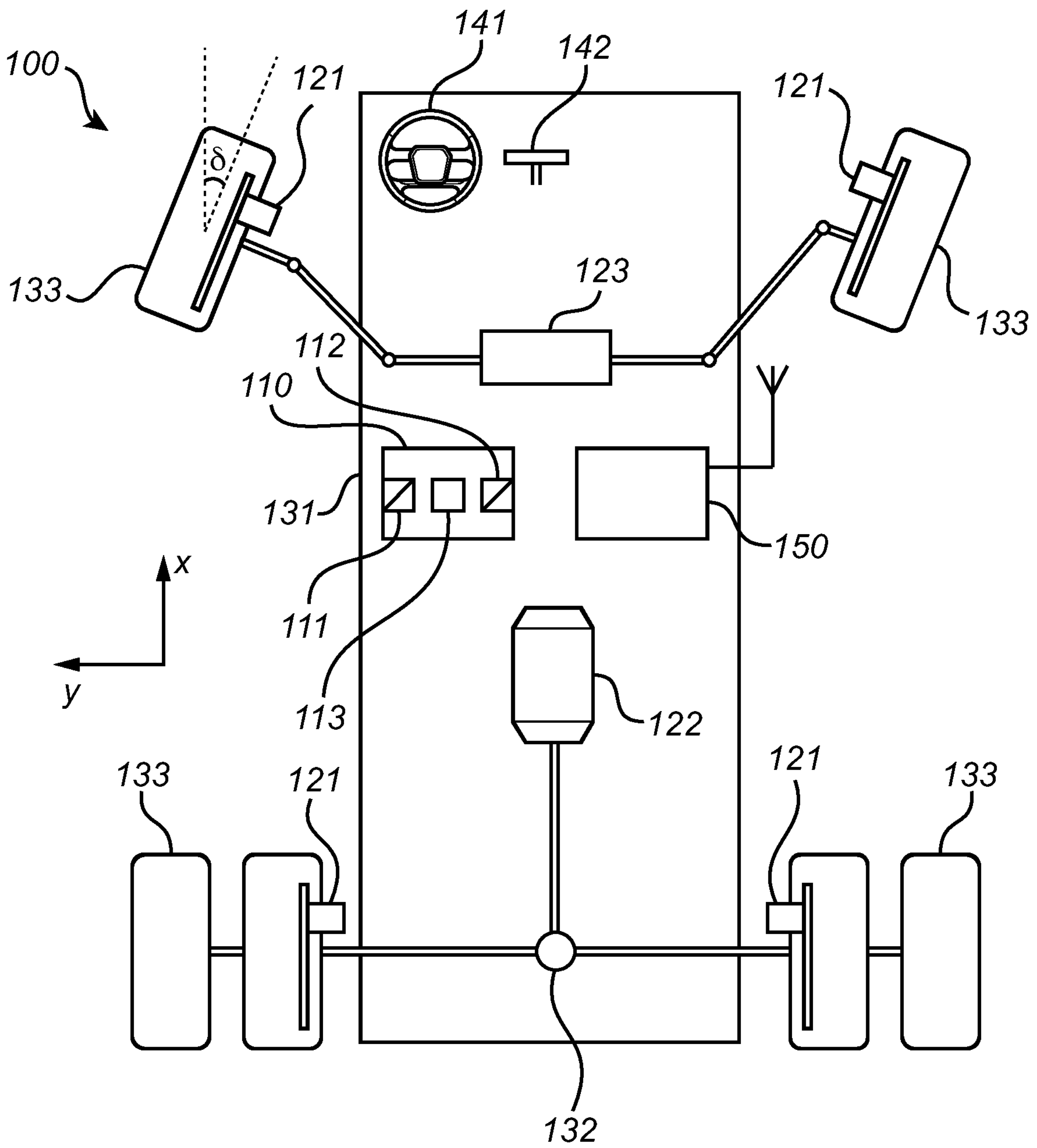
FIG. 1 is a top view of a vehicle chassis with a plurality of motion actuators and a driver interface for obtaining motion requests from a driver.

FIG. 1 is a top view of a chassis of a vehicle 100 generally consisting of a frame 131, four wheels 133, a plurality of motion actuators and a driver interface. The axes x, y indicate longitudinal and lateral directions of the vehicle's 100 moving reference frame, which further includes a vertical axis z directed outward from the plane of the drawing. The motion actuators include service brakes 121 at each wheel 133, a drivetrain acting on the rear wheels 133, and a steering arrangement 123 configured to alter a steering angle $\delta$ of the front wheels 133. The service brakes may be friction brakes (e.g., disc brakes, drum brakes) or electromagnetic brakes (e.g., eddy-current brakes). The drivetrain includes an electric or internal-combustion propulsion unit 122 connected to the rear wheels over a transmission arrangement 132. If the propulsion unit 122 is electric, it may be used both for accelerating the vehicle forward or backward (i.e., increasing its kinetic energy) and for electromagnetic braking. A combustion-powered propulsion unit 122 may be operable as a non-generative engine brake, using the engine's inherent friction or by an engine retarder mechanism. The totality of the motion actuators may be considered to constitute a motion support system (MSS).

The driver interface, which is optional if the vehicle 100 is adapted purely for autonomous driving, may include a steering wheel 141 and a pedal 142. The pedal 142 may be biased in the direction towards the driver and optionally pre-loaded. It may be the sole pedal of the driver interface. Alternatively, the driver interface may include one accelerator pedal and one brake pedal, and possibly further pedals. A single-pedal driver interface may be configured in such manner that increasing the pedal depression corresponds to an increasing acceleration request (e.g., similarly to a conventional accelerator pedal), whereas releasing the pedal will eventually initiate braking action. For example, releasing the single pedal 142 fully may signify braking with a constant deceleration. Alternatively, releasing the single pedal 142 fully may signify reducing the vehicle speed to a preset level as soon as practicable (e.g., subject to a safety constraint on maximum acceleration).

The vehicle 100 is further equipped with sensorics for monitoring in real time the vehicle's force and moment capabilities and at least one motion state.

As a primary use case of the invention, heavy commercial vehicles with a relatively limited electric propulsion power (and hence an equally limited electric electromagnetic braking power, especially regenerative braking power) per unit mass of the vehicle are envisioned. In quantitative terms, a heavy commercial vehicle may be equipped with propulsion actuators for a total propulsion power per unit vehicle mass of 20 kW/ton or less, 10 kW/ton or less, or 5 kW/ton or less. The figures on vehicle mass refer to the fully laden condition and all vehicle units of a combination vehicle; it may be of the order of tens of ton, such as ≥10 ton, ≥20 ton, ≥30 ton or ≥40 ton. Electric actuators in the dual use as propulsion actuators and braking actuators may have a propulsion power approximately equal to the electromagnetic braking power. The techniques disclosed herein are suitable at least for vehicles with these characteristics. They are also suitable for even lower power-to-mass ratios, e.g., down to 2.2 kW/ton, which is the regulatory minimum motorization in some jurisdictions.

The vehicle 100 depicted in FIG. 1 further comprises a controller 110 communicatively coupled to the motion actuators, and a communication interface 150. The communication interface 150 may be compliant with a cellular or non-cellular wireless communication protocol, thereby allowing an exchange of data with a remote party. In particular, the communication interface 150 may be used to enable autonomous driving, wherein the motion requests are obtained not from a driver interface but from an operator located outside the vehicle. In particular, the motion requests may be derived from higher-level commands received from the operator; the higher-level commands may comprise utility tasks or missions to be completed by the vehicle 100. The derivation may be performed by an autonomous driving system (ADS).

The controller 110 comprises a motion-request interface 111 configured to obtain motion requests (e.g., from the driver interface, or by processing higher-level commands), processing circuitry 113, and a control interface 112 configured to feed control signals to the motion actuators. Optionally, the control interface 112 is configured to receive sensor signals from the above-described sensorics.

Figure 6:
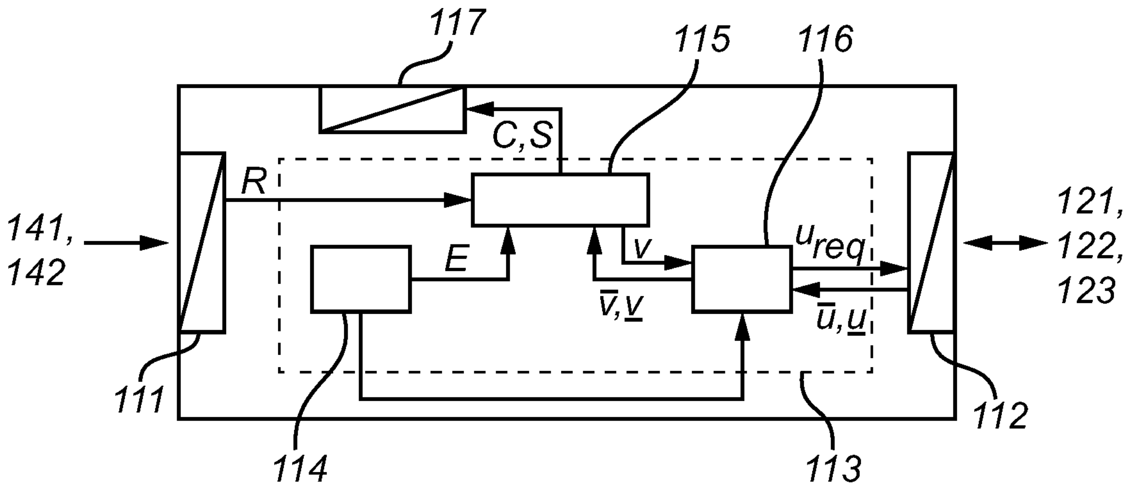
FIG. 6 is a block diagram of the inner workings of a vehicle controller.

The processing circuitry 113 may be configured to provide actuator signals u to the motion actuators on the basis of the motion requests it obtains and, more precisely, to solve an optimization problem related to optimal control of the motion actuators in accordance with the obtained motion requests. FIG. 6 shows, in block-diagram form, a possible inner structure of the vehicle controller 110, which may be included in a vehicle motion management (VMM) system. As shown in FIG. 6, the processing circuitry 113 may have various sub-components, such as:

- a motion estimation component 114 configured to provide an estimate E of motion quantities based on the sensor signals;
- a global force generation component 115 configured to provide a global force vector v on the basis of said estimates E and the motion requests R, and optionally to provide capabilities C and status S of the vehicle, to be displayed at an operator interface 117; and/or
- a motion coordination component 116 configured to provide an actuator signal $u_{req}$ to be fed to the motion actuators on the basis of the global forces v, actuator limitations $\overline{u}$, $\underline{u}$, as well as motion quantities estimated by the motion estimation component 114.

To formulate an optimization problem for the actuator coordination of the motion control problem, the inputs are vehicle parameters like mass, inertia, tire radius, tire cornering stiffness, and desired control targets like desired longitudinal and lateral forces, target service brake power and target powertrain power. It is assumed that the MSS can be modelled, in the neighborhood of a working point at the current vehicle state, as a linear dynamical system with a state vector x governed by the following equations $$\begin{cases} x'(t) = Ax(t) + Bu(t) \\ y(t) = Cx(t) + Du(t) \end{cases} \tag{1}$$

where y is an observation signal and A, B, C, D are constant matrices. This may represent a linearization of a nonlinear vehicle model which is valid at the working point. Letting $u_d$ denote desired actuator requests and v denote global forces and moments, the optimization problem can be written as follows:

$$\min_u \|W_u(u-u_d)\|_2^2 + \gamma\|W_v(Bu-v)\|_2^2 \tag{2}$$

$$\text{s.t. } \underline{u} \le u \le \overline{u}$$

$$Ku \le L$$

$$Mu = N$$

Here, with respect to the (x, y, z) reference frame introduced above, the global forces are a vector of longitudinal force, lateral force and yaw moment, $$v = [F_x \ F_y \ M_z]^T,$$

and the matrix B appearing in the cost functional is the control effectiveness matrix is as defined above. The control effectiveness matrix need not coincide with B in the linear dynamical system equations (1). It represents a static model of the global forces as a function of the actuator signals. The constants $\overline{u}$, $\underline{u}$ represent actuator limits, which can be functions of the current vehicle state. For example, the maximum propulsion force (positive and negative, corresponding to acceleration and electromagnetic braking) for some motion actuators may decrease above a certain velocity due to power limitations. The maximum positive and negative propulsion force of other actuators, with a different gear ratio, may instead become power-limited already at lower velocities. In the equality and inequality constraints of the optimization problem (2), K, L, M, N are constant matrices which may absorb parts of the information contained in matrices A, B, C, D in equation (1) and more complex capabilities.

In the case of a 4×2 tractor with four service brakes 121, one electric propulsion unit 122 and one steering arrangement 123, as shown in FIG. 1, the optimization variable u may have six components, corresponding to respective actuator signals:

$$u = [T_{b,1} \ T_{b,2} \ T_{b,3} \ T_{b,4} \ T_{em} \ \delta]^T.$$

If the steering angle δ is controlled directly by the driver, its current value will instead be directly or indirectly included in the vehicle state x. It follows that, in this case, the control effectiveness matrix B is a 3×6 matrix, in which each non-zero element represents a positive or negative dependency between a global force component and the action of a motion actuator.

In the cost functional to be minimized, the matrix $W_u$ sets relative priorities how the respective components of the desired actuator-request vector $u_d$, and the matrix $W_v$ expresses the relative priorities of the global forces and moments. The matrices $W_u$, $W_v$ may be described as weighting matrices. The constant $\gamma>0$ balances the importance of the first and second terms of the cost functional.

By expanding the terms in the cost function $$\|W_u(u-u_d)\|_2^2 = u^T W_u^T W_u u - 2u_d^T W_u^T W_u u + C_1,$$

$$\|W_v(Bu-v)\|_2^2 = u^T B^T W_v^T W_v Bu - 2v^T W_v^T W_v Bu + C_2,$$

and neglecting the constants $C_1$, $C_2$, the above optimization problem (2) can be written as a standard quadratic programming (QP) problem:

$$\min_u \frac{1}{2} u^T H u + g^T u \tag{3}$$

$$\text{s.t. } \underline{u} \le u \le \overline{u}$$

$$Ku \le L$$

$$Mu = N$$

with $$H = 2\left(W_u^T W_u + \gamma B^T W_v^T W_v B\right),$$

$$g^T = -2\left(u_d^T W_u^T W_u + \gamma v^T W_v^T W_v B\right).$$

As mentioned, several solvers capable of numerically solving the QP problem efficiently and accurately are available in the literature or as commercial software, including interior-point (IP) methods, active-set (AS) methods, and Alternating Direction Method of Multipliers (ADMM) methods. Different optimization methods have different properties, and for some problems there can be differences in the execution time, speed of convergence, solution accuracy, etc. These properties are particularly relevant for control optimizers running in embedded systems in vehicles, with limitations like the precision of the floating-point arithmetic used and energy supply. The output of a solver can be an approximate solution u, which is—or can be transformed into—an actuator-signal vector $u_{req}$ including for instance brake torques and electric-machine torques. It is noted that the approximate solution need not correspond to an actual optimum; the degree of accuracy and/or convergence required may be dependent on the expected accuracy of the sensor signals, the expected accuracy of the actuators and the tolerance to minor control imperfections in the use case. The motion coordination component 116 can be responsible for transforming the output of the solver into an actuator-signal vector $u_{req}$.

It is optional to include an equality condition Bu=v in the QP problem (3), where v is the global force vector. This may ensure that the control inputs are achieved if the QP problem (3) is successfully solved. Another equality constraint may reflect a braking rule, i.e., a preferred distribution of a total requested brake force to the individual service brakes 121 and the propulsion unit 122 (in electromagnetic braking mode) if applicable.

Additionally or alternatively, only such v are accepted which satisfy $$\min_{\underline{u} \le u \le \overline{u}} Bu = \underline{v} \le v \le \overline{v} = \max_{\underline{u} \le u \le \overline{u}} Bu.$$

This calculation may be performed by the global force generation component 115. Applying these upper and lower limits on v helps ensure that the solving of the QP problem (3) is feasible.

Further additionally or alternatively, the matrices in the cost functional may have different values in the uphill drive mode and the regular drive mode, e.g., $(H, g)=(H_1, g_1)$ or $(H, g)=(H_2, g_2)$. The matrix H in the quadratic term includes relationships between power loss and torque, and may especially include such relationships for at least two of the actuators.

Figure 2:
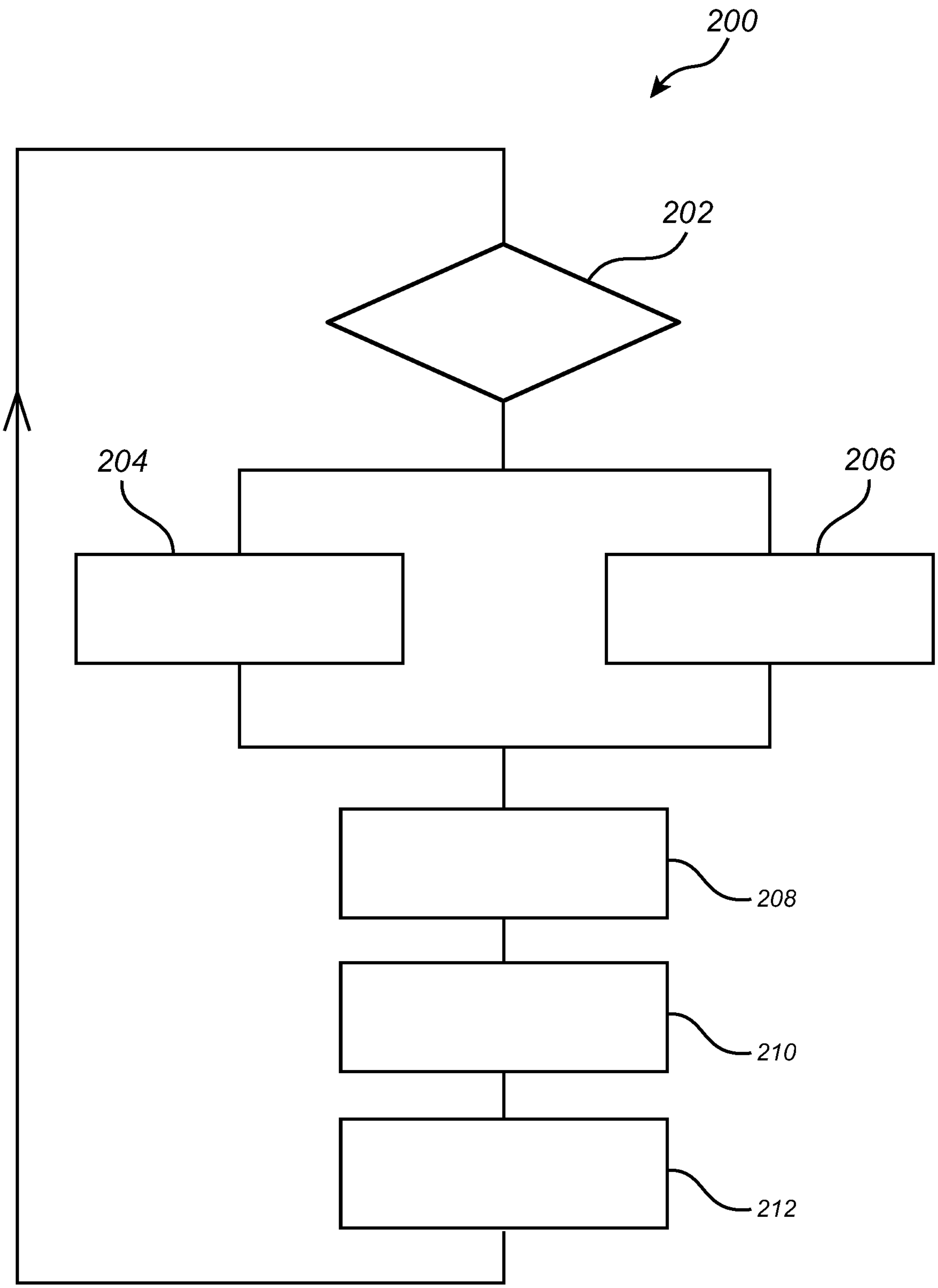
FIG. 2 is a flowchart of a vehicle-control method according to embodiments herein.

Having now outlined the generic control framework of the vehicle 100, attention will be directed specifically to the contributions of the present disclosure. In particular, the controller 110 may be configured to perform a vehicle-control method 200 depicted in flowchart form in FIG. 2.

Figure 4:
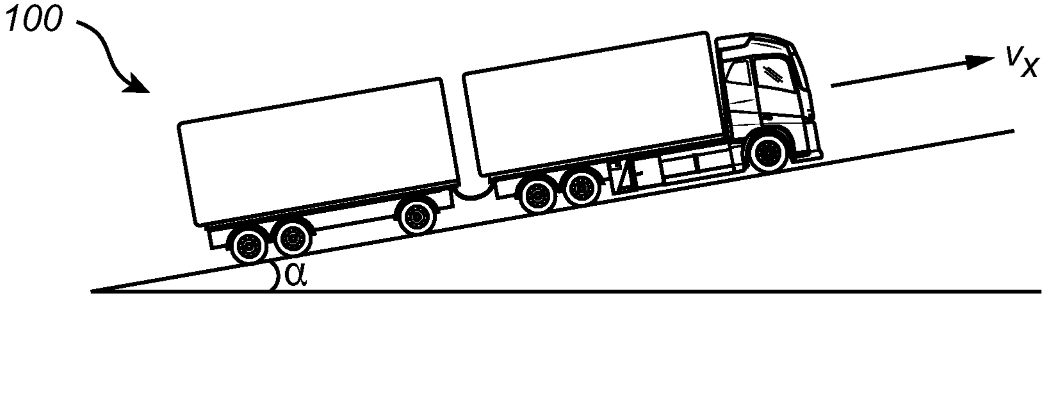
FIG. 4 illustrates the quantities longitudinal inclination $\alpha$ and longitudinal speed $v_x$ for a two-unit vehicle combination.

In an initial step 202 of the method, the longitudinal inclination $\alpha$ and speed $v_x$ of the vehicle are determined. These quantities are illustrated in FIG. 4 in the case of a vehicle combination. The longitudinal inclination $\alpha$ normally corresponds to the local grade or local average grade of a road on which the vehicle combination is moving. The longitudinal inclination $\alpha$ is a signed quantity such that positive values correspond to uphill orientation of the vehicle (i.e., the forward direction of the vehicle is inclined upwardly), and negative values correspond to downhill orientation. Indeed, if the vehicle in FIG. 4 had been reversing down the slope (i.e., to the left in the figure), it would still be experiencing a positive longitudinal inclination $\alpha$. It is noted for completeness that the teachings of the present disclosure are applicable to an individual vehicle, to a vehicle in a vehicle combination, or to a vehicle combination as a whole, wherein the vehicle combinations may have two, three or more units.

Figure 3:
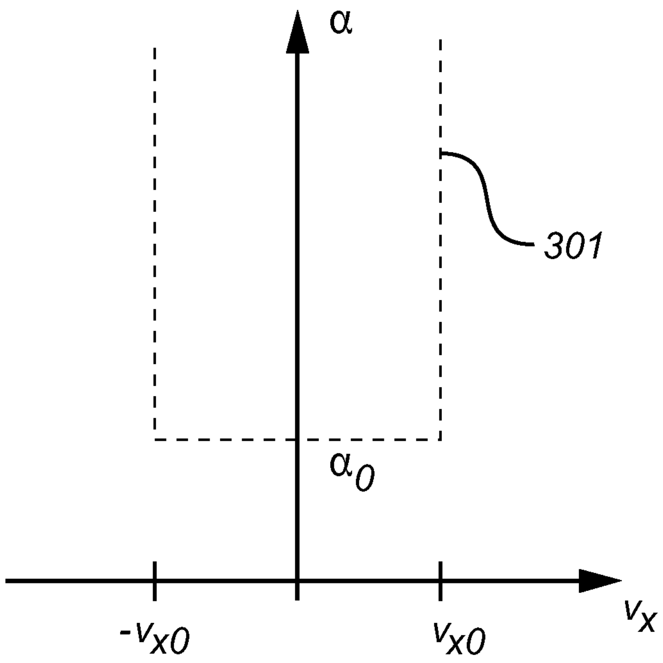
FIG. 3 visualizes, in a speed-inclination plane, a boundary between regions of applicability of an uphill drive mode and a regular drive mode.

Next, a decision is made whether to select 204 an uphill drive mode or to select 206 a regular drive mode. The uphill drive mode is selected if the longitudinal inclination is greater than an inclination threshold ($\alpha>\alpha_0$) and the absolute speed is less than a speed threshold ($|v_x|<v_{x0}$), and the regular drive mode is selected if any of these conditions is not fulfilled. The two thresholds $\alpha_0$, $v_{x0}$ are understood to be configurable positive quantities. Reference is made to FIG. 3, where the horizontal axis represents longitudinal speed, the vertical axis represents longitudinal inclination, and the curve 301 delimits the point set $$\{(v_x, \alpha): |v_x| < v_{x0}, \alpha > \alpha_0)\}.$$

The choice between steps 204 and 206 may be described as establishing whether the vehicle state is located inside or outside the curve 301.

In a subsequent step 208, motion requests are obtained. As already explained, motion requests R may be obtained (e.g., received, requested, read) from a driver interface. Alternatively, in an autonomous-driving use case, the motion requests are obtained from an operator outside the vehicle or derived from higher-level commands.

In a next step 210 of the method 200, a solution to an optimization problem related to optimal control of the motion actuators in accordance with the obtained motion requests is provided. Above equations (2) and (3) are optimization problems of this type. Solving the optimization problem may include initially deriving a global force vector v from the motion requests R. This derivation may be carried out while considering actuator limits $\underline{u}$, $\bar{u}$ or global force limits $\underline{v}$, $\bar{v}$, or both. The derivation of the longitudinal component $F_x$ may include summing a force corresponding to an acceleration request (e.g., from a driver), a force contribution opposing dissipative forces (e.g., aerodynamic drag and rolling resistance), and a further force contribution compensating the gradient or gravitational force. The gradient or gravitational force may be proportional to Mg sin α, optionally multiplied by a safety factor such as 1.05-1.10, where M is the vehicle mass.

The solution is provided 210 in accordance with the selected drive mode, that is, uphill drive mode or regular drive mode. In particular, the control effectiveness matrix B is defined differently in the uphill drive mode and the regular drive mode. In the running example with $u=[T_{b,1}\ T_{b,2}\ T_{b,3}\ T_{b,4}\ T_{em}\ \delta]^T$, the control effectiveness matrix may have the following appearance in the uphill drive mode:

$$B=\begin{bmatrix} -\frac{1}{R_e} & -\frac{1}{R_e} & -\frac{1}{R_e} & -\frac{1}{R_e} & \frac{1}{R_e} & 0 \\ 0 & 0 & 0 & 0 & 0 & 2C_\alpha \\ -\frac{w_1}{2R_e} & \frac{w_1}{2R_e} & -\frac{w_2}{2R_e} & \frac{w_2}{2R_e} & 0 & 2C_\alpha l \end{bmatrix} \tag{4}$$

and may be defined as follows in the regular drive mode:

$$B=\begin{bmatrix} \frac{1}{R_e} & \frac{1}{R_e} & \frac{1}{R_e} & \frac{1}{R_e} & \frac{1}{R_e} & 0 \\ 0 & 0 & 0 & 0 & 0 & 2C_\alpha \\ -\frac{w_1}{2R_e} & \frac{w_1}{2R_e} & -\frac{w_2}{2R_e} & \frac{w_2}{2R_e} & 0 & 2C_\alpha l \end{bmatrix} \tag{5}$$

Here, $R_e$ denotes an equivalent wheel radius, $w_1$, $w_2$ are front and rear track widths, l is the wheelbase, and $C_\alpha$ a cornering stiffness of the wheels 133. It is noted that four first elements on the upper row of the control effective matrix B have opposite signs in the uphill drive mode (4) and the regular drive mode (5). These elements represent a dependency between the longitudinal global force $F_x$ on the vehicle and the action of the four services brakes (friction brakes) 121, such as the contribution to global force $F_x$ of the first service-brake torque, according to the upper row of B, by which $F_x=\pm T_{b,1}/R_e$.

It is noted that, in variations of this embodiment, an element of B may values in the uphill drive mode (4) and the regular drive mode (5) that differ not only with respect to sign but also with respect to magnitude. For example, the (1,1) element above may have values $$-1/R_e \text{ and } 1/R_e', \text{ where } R_e \neq R_e'.$$

This may be used to provide better agreement with known actuator behavior and/or improve the driving experience.

In a subsequent step 212, the solution thus provided is used as a basis for controlling the motion actuators of the vehicle 100. The execution flow may then loop back to the initial step 202.

It is noted that the execution of the steps on the vehicle-control method 200 need not be strictly sequential. For example, the motion requests may be obtained 208 before the longitudinal inclination α and speed $v_x$ are determined 202, or simultaneously therewith. Further, without departing from the scope of the present invention, the execution of step 212 may continue while the execution flow loops back to refresh the values of the longitudinal inclination α and speed $v_x$ and/or to obtain 208 updated motion requests.

The weighting matrix $W_u$ appearing in equation (2) (and implicitly in equation (3)) may express a braking rule that specifies a preferred distribution of total requested brake force to the vehicle's motion actuators. In some embodiments of the method 200, the matrix $W_u$ may be defined differently in the uphill drive mode and the regular drive mode, each of these definitions of the weighting matrix involving a different braking rule. For example, a first braking rule may specify predominant use of the friction brakes, and a second braking rule may specify predominant use of the electromagnetic braking. As another example, the distribution of braking force between the front and rear axles could be different between the first and second braking rules. In some implementations, the first or the second braking rule, or both, is dependent on the vehicle's longitudinal speed $v_x$. This is to say, the matrix $W_u$ contains some elements that vary in response to whether the uphill drive mode or the regular drive mode has been selected, and these elements may be further adjusted (fine-tuned) in accordance with the vehicle speed $v_x$. This way, in the interest of safety, provision can be made for the fact that the driver's reaction time corresponds to a longer rolling distance at higher speed, e.g., by gradually giving higher priority to braking distance minimization over energy economy as the speed increases.

Figure 5:
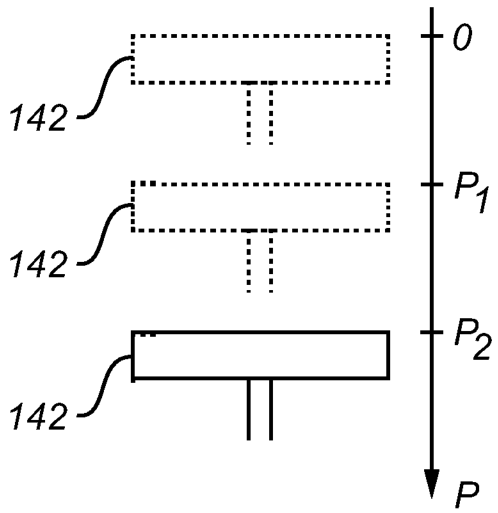
FIG. 5 illustrates movements of a depressible pedal of a driver interface.

Some embodiments are adapted for use cases where the motion requests are obtained from a single-pedal driver interface in the uphill drive mode. In these embodiments, the optimization problem is further dependent on a weighting matrix $W_u$ which, in the uphill drive mode, is defined to specify a braking rule such that the preferred brake-force distribution varies with said single pedal's current depression. Reference is made to FIG. 5, where the downward vertical axis represents depression P. The term pedal depression is not meant to suggest literally that the signal has been generated by a human driver mechanically depressing a physical pedal. Rather, an acceleration-level signal provided from an ADS may be used in the exact same way as a classical pedal-depression signal and is encompassed by the term "pedal depression".

It is noted that, in other embodiments, the braking behavior of the vehicle is modified by defining the weighting matrix $W_v$ differently in the two drive modes. It is recalled that the weighting matrix $W_v$ acts on the difference of global forces and approximate actuator outputs Bu−v in the optimization problem (2). This can be achieved by extending the global force vector with further components, such as the total force from all service brakes and the total force from all electric propulsion units in the vehicle 100, e.g.:

$$v=[F_x\ F_y\ M_z\ F_{x,sb}\ F_{x,em}]^T.$$

These embodiments may be adapted specifically for vehicles 100 equipped with motion actuators that include at least one electric propulsion actuator 122 capable of electromagnetic (including regenerative) braking and further include one or more friction brakes 121. The braking rule in the uphill drive mode may then specify predominant use of the friction brakes when said single pedal is depressed less than a first depression threshold $P_1$, and predominant use of the electromagnetic braking when said single pedal is depressed more than a second depression threshold $P_2$. In the range between the first depression threshold $P_1$ and second depression threshold $P_2$, the brake force may be distributed based on an interpolation between said predominant use of the friction brakes and said predominant use of the electromagnetic braking.

Figure 7:
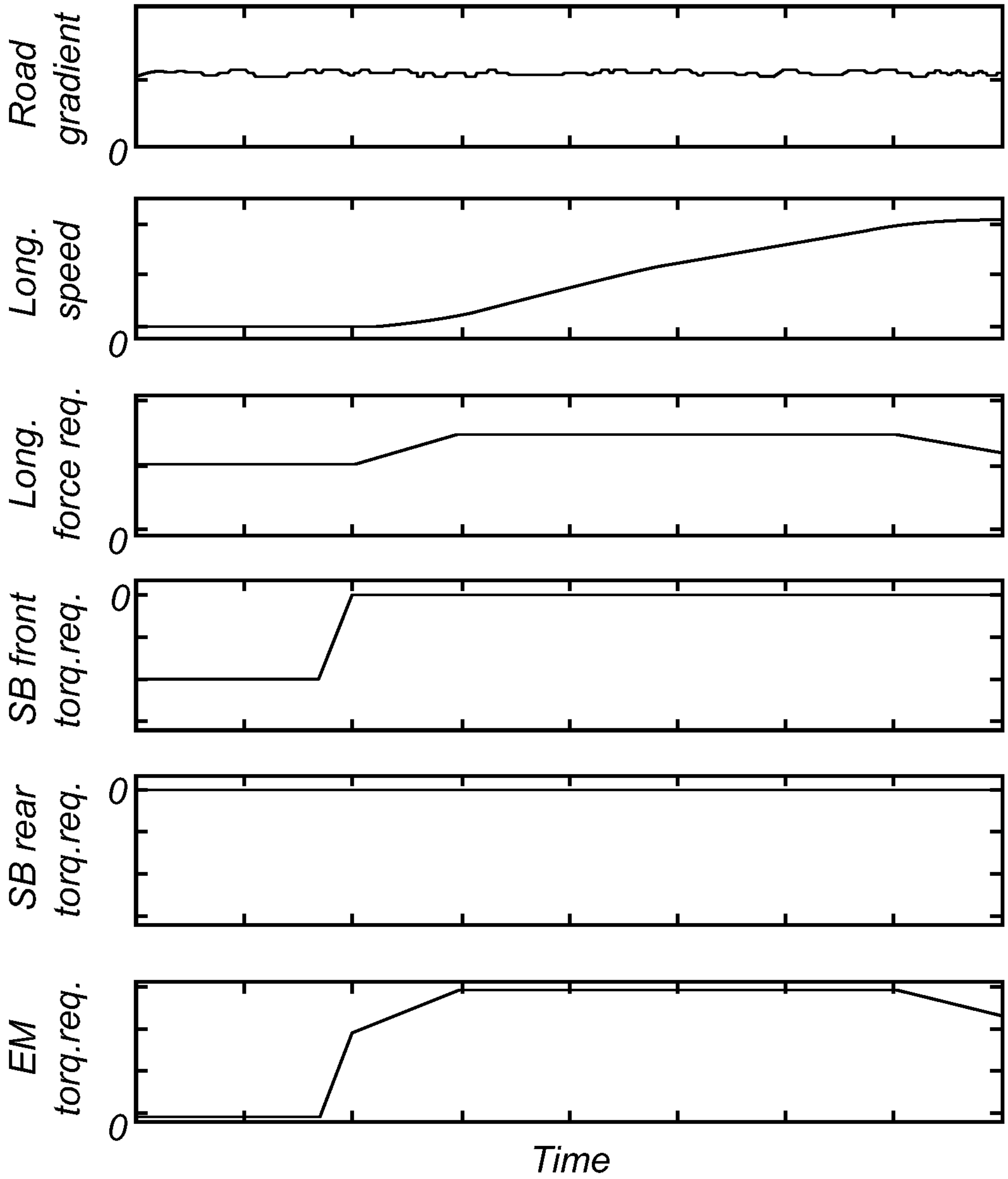
FIG. 7 are plots showing the time evolution of road gradient (or longitudinal inclination) $\alpha$, longitudinal speed $v_x$, longitudinal force request, front and rear service-brake (SB) torque request, and electric machine (EM) torque request, as recorded for a heavy commercial vehicle during a test run.

FIG. 7 contains six plots showing the time evolution of road gradient (or longitudinal inclination) $\alpha$, longitudinal speed $v_x$, longitudinal force request, front and rear service-brake (SB) torque request, and electric machine (EM) torque request, as recorded during a test run. Initially, the vehicle 100 is in uphill drive mode and transitions into regular drive mode as its longitudinal speed raises above a predefined threshold.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. For example, these claims encompass a vehicle control method where a downhill drive mode is selectable in addition to the uphill drive mode and regular drive mode.

The invention claimed is:

1. A method of controlling a vehicle with a plurality of motion actuators, the method comprising:

determining a longitudinal inclination $\alpha$ and speed $v_x$ of the vehicle;

selecting an uphill drive mode if the longitudinal inclination is greater than an inclination threshold $\alpha > \alpha_0$ and an absolute speed is less than a speed threshold $|v_x| < v_{x0}$, and otherwise selecting a regular drive mode;

obtaining motion requests;

in accordance with a selected drive mode, providing a solution to an optimization problem related to optimal control of the plurality of motion actuators in accordance with the obtained motion requests; and controlling the plurality of motion actuators in accordance with the solution to the optimization problem, wherein the optimization problem is dependent on a control effectiveness matrix which is defined differently in the uphill drive mode and the regular drive mode.

2. The method of claim 1, wherein at least one element in the control effectiveness matrix has opposite signs in the uphill drive mode and the regular drive mode.

3. The method of claim 2, wherein the at least one element in the control effectiveness matrix represents a dependency between a longitudinal global force on the vehicle and the action of a friction brake.

4. The method of claim 1, wherein the optimization problem is further dependent on a weighting matrix, which is defined differently in the uphill drive mode and the regular drive mode, each of the weighting matrices involving a braking rule that specifies a preferred distribution of total requested brake force to the vehicle's motion actuators.

5. The method of claim 4, wherein at least one of the braking rules is dependent on the vehicle's speed $v_x$.

6. The method of claim 1, wherein:

the motion requests are obtained from a single-pedal driver interface in the uphill drive mode; and the optimization problem is further dependent on a weighting matrix which, in the uphill drive mode, is defined to specify a braking rule such that a preferred brake-force distribution varies with the single pedal's current depression.

7. The method of claim 6, wherein the motion actuators include at least one electric propulsion actuator capable of electromagnetic braking and further include one or more friction brakes, wherein the braking rule in the uphill drive mode specifies:

predominant use of the one or more friction brakes when the single pedal is depressed less than a first depression threshold $P_1$, and predominant use of the electromagnetic braking when the single pedal is depressed more than a second depression threshold $P_2$.

8. The method of claim 7, wherein the braking rule in the uphill drive mode further specifies:

distributing brake force based on an interpolation between the predominant use of the one or more friction brakes and predominant use of the electromagnetic braking, respectively, in a range between the first and second depression thresholds.

9. The method of claim 1, wherein the optimization problem is a control allocation problem on quadratic programming form.

10. The method of claim 1, wherein the vehicle is a heavy commercial vehicle.

11. A controller configured for real-time control of motion actuators in a vehicle in accordance with motion requests, the controller comprising:

a motion-request interface configured to obtain motion requests;

processing circuitry configured to perform the method of claim 1; and a control interface configured to feed control signals to the motion actuators.

12. A computer program comprising instructions to cause the controller of claim 11 to perform a method of controlling a vehicle with a plurality of motion actuators, the method comprising:

determining a longitudinal inclination and speed of the vehicle;

selecting an uphill drive mode if the longitudinal inclination is greater than an inclination threshold and the absolute speed is less than a speed threshold, and otherwise selecting a regular device mode;

obtaining motion requests;

in accordance with the selected drive mode, providing the solution to the optimization problem related to optimal control of the motion actuators in accordance with the obtained motion requests; and controlling the motion actuators in accordance with the solution to the optimization problem, wherein the optimization problem is dependent on a control effectiveness matrix which is defined differently in the uphill drive mode and the regular drive mode.

* * * * *